United States Patent [19]

Roche et al.

[11] Patent Number: 5,079,104

[45] Date of Patent: Jan. 7, 1992

[54] INTEGRATED FUEL CELL STACK SHUNT CURRENT PREVENTION ARRANGEMENT

[75] Inventors: Robert P. Roche, Cheshire; Michael P. Nowak, Bolton, both of Conn.

[73] Assignee: International Fuel Cells, South Windsor, Conn.

[21] Appl. No.: 670,845

[22] Filed: Mar. 18, 1991

[51] Int. Cl.$^5$ .............................................. H01M 8/24
[52] U.S. Cl. ......................................... 429/18; 429/36
[58] Field of Search ............................. 429/18, 34–36, 429/38, 39; 204/228

[56] References Cited

U.S. PATENT DOCUMENTS

| | | | |
|---|---|---|---|
| 4,371,433 | 2/1983 | Balko et al. | 429/18 X |
| 4,588,660 | 5/1986 | Shimizu et al. | 429/35 |
| 4,590,134 | 5/1986 | Warszawski et al. | 429/35 |

*Primary Examiner*—Anthony Skapars
*Attorney, Agent, or Firm*—Peter R. Ruzek

[57] ABSTRACT

A fuel cell stack includes a plurality of fuel cells juxtaposed with one another in the stack and each including a pair of plate-shaped anode and cathode electrodes that face one another, and a quantity of liquid electrolyte present at least between the electrodes. A separator plate is interposed between each two successive electrodes of adjacent ones of the fuel cells and is unified therewith into an integral separator plate. Each integral separator plate is provided with a circumferentially complete barrier that prevents flow of shunt currents onto and on an outer peripheral surface of the separator plate. This barrier consists of electrolyte-nonwettable barrier members that are accommodated, prior to the formation of the integral separator plate, in corresponding edge recesses situated at the interfaces between the electrodes and the separator plate proper. Each barrier member extends over the entire length of the associated marginal portion and is flush with the outer periphery of the integral separator plate. This barrier also prevents cell-to-cell migration of any electrolyte that may be present at the outer periphery of the integral separator plate while the latter is incorporated in the fuel cell stack.

10 Claims, 1 Drawing Sheet

INTEGRATED FUEL CELL STACK SHUNT CURRENT PREVENTION ARRANGEMENT

DESCRIPTION

1. Technical Field

The present invention relates to fuel cell devices in general, and more particularly to an arrangement for avoiding the flow of shunt currents at the periphery of a fuel cell stack.

2. Background Art

There are already known various constructions of fuel cell devices, most if not all of which include a multitude of individual fuel cells that are arranged in fuel cell groups or stacks. As is well known, each such fuel cell includes an anode, a cathode, and a quantity of electrolyte or another ion transfer or exchange medium that is present at least between (and often also within) the anode and the cathode Then, as hydrogen (or another gaseous fuel) and oxygen (as such or as an ingredient of air) are supplied to the anode and the cathode, respectively, an electrochemical reaction takes place in each of such individual fuel cells, resulting in the formation of water as the reaction product, with attendant creation of electrical potential difference between the anode and the cathode that is then utilized, ordinarily in conjunction with that created in the other fuel cells, to supply electric power to an external user device or circuit Often, but not always, the reactants (fuel and oxygen-carrying medium) are supplied to regions of the electrodes that are situated at opposite major surfaces of such electrodes from those facing the electrolyte. Under these circumstances, at least the effective region of each anode and of each cathode has a porous structure to allow penetration of at least the respective gaseous reactant therethrough from the respective gaseous medium supply side to the areas at which the desired, usually catalytically promoted, electrochemical reaction takes place in the presence of the electrolyte The individual fuel cells of the fuel cell stack are typically separated from one another by respective separator plates that are interposed between the fuel cells and are usually electrically conductive but, to the extent possible, impervious both to liquids and gases.

Experience especially with fuel cell devices employing acid electrolytes has shown that some of the electrolyte is lost during the operation of the device. Primarily for this reason, each of the fuel cells is initially charged with a quantity of electrolyte that is in excess of that needed at the outset of the fuel cell device operation but is sufficient for sustaining the operation of the device for an extended period of time, such as for 40,000 hours, despite the electrolyte losses. The excess electrolyte is usually accommodated in one or both of two porous plate-shaped structures of each fuel cell that constitute or are provided with the respective anode and cathode electrodes, so that such structures are sometimes referred to as electrolyte retention plates.

Various measures are then taken to minimize the amount of electrolyte escaping from the individual fuel cells. One of such measures involves the sealing of all the passages through which the electrolyte could escape from the fuel cells. This includes not only sealing the interfaces between the adjacent ones of the various components (cathodes, anodes, separator plates, etc.) of the fuel cell stack, but often also the plugging of the pores of the anode and the cathode components at the edge regions thereof. However, it was discovered that, despite all precautions, some electrolyte still reaches the outer periphery of the fuel cell stack. Then, in view of the fact that the separator plates are usually made of a material that is capable of being wetted by the electrolyte, this escaping electrolyte also wets the outer periphery of the respective separator plate.

This has basically two disadvantageous consequences. For one, it results in electrolyte migration through the fuel stack in the course of operation of the latter. More particularly, it was discovered that, over the useful operating life of a fuel cell device consisting of a stack of juxtaposed fuel cells separated from each other by respective separator plates and employing a liquid electrolyte, the electrolyte concentration and/or amount in the fuel cells, which is originally substantially uniform throughout the stack, gradually changes to a substantially increased value at one end of the stack and a substantially decreased value at the other end of the stack, with the values for the fuel cells situated between such ends gradually decreasing from the one end to the other. This eventually results in electrolyte flooding of the cell or cells situated at or near the one end, and in drying out of the affected fuel cell or cells at or near the other end of the stack. Each of these conditions is equally undesirable in that it has a deleterious effect on the performance of the affected fuel cells and may even result in premature deterioration or even complete destruction thereof.

The other of the aforementioned disadvantageous consequences is that the electrolyte present on the peripheral surface of the separator plate forms at least one path of relatively low electrical resistance, thus rendering it possible for electrical shunt current to flow at such surface and thus possibly cause or contribute to corrosion at the peripheral region of the fuel cell stack.

At first, it was assumed, quite correctly, that the aforementioned electrolyte migration was attributable to the less than perfect imperviousness of the separator plates to the passage of liquid therethrough in that the electrolyte was driven by electrical forces existing in the fuel cell stack through the respective separator plates in the direction from the other end to the one end of the stack. However, more recently, it was established that electrolyte migration occurs even when the separator plates are highly or completely impervious to the electrolyte, and even when the electrolyte is prevented from reaching the separator plate within the fuel cell in the first instance. This led to the conclusion, confirmed by observation, that it is the escaping electrolyte present at the periphery of the stack that travels on the peripheral surface of the respective separator plate from one to the next adjacent fuel cell and so on in succession, being propelled by the aforementioned electrical forces.

Even those fuel cell stack constructions that employ so-called integral separator plates are not immune to the above problems. As is known, an integral separator plate is a structure basically consisting of a separator plate proper and respective electrolyte retention plates or electrodes adjoining and secured to the separator plate in juxtaposition with the respective major surfaces thereof, each of such electrodes forming a part of a different fuel cell upon assembly of the fuel cell stack. The above problems exist in this construction even if, as is often the case, a sheet of electrolyte-impermeable and usually electrolyte-nonwettable material is interposed during the assembly of the integral separator plate between the major surface of the separator plate and the active area of the respective electrolyte retention plate, followed by application of pressure and/or heat to the assembly to cause the material of the sheet to penetrate into the pores of the electrolyte retention plate to a depth sufficient to prevent the electrolyte from reaching the separator plate, while simultaneously achieving the required good electrical contact between the respective electrolyte retention plate and the separator plate due to the removal of such material from the contact areas. Even here, however, even though the interfaces between the electrolyte retention plates and the separator plate of the unitary integral separator plate are, for all intents and purposes, completely sealed by the sheet material, some electrolyte is still able to reach the outer periphery of the respective fuel cells, cross over to the outer peripheral surface of the separator plate and wet the same.

It was also attempted to dispense with the separator plate proper and with the aforementioned sheets in the manufacture of the integral separator plate, by combining their functions in a single intermediate component made of a so-called graphite skived material including a fluorinated hydrocarbon (for its capability of bonding the electrodes to one another, and for its impermeability to electrolyte) in intimate mixture with graphite (to confer the desired degree of electric conductivity on this composite material). However, it has been established that, as the outer peripheral surfaces of the integral separator plate are machined, as they must be in order to remove excess material therefrom, a large number of graphite particles is exposed at such surfaces and, moreover, graphite is smeared over and adheres to these surfaces, thus creating partially electrolyte-wettable bridges spanning the intermediate component and thus allowing flows of electrolyte and shunt electric current to occur across the outer peripheral surface of the intermediate component between the two electrodes adjoining the same.

Accordingly, it is a general object of the present invention to avoid the disadvantages of the prior art.

More particularly, it is an object of the present invention to provide a fuel cell device consisting of a stack of juxtaposed individual fuel cells containing a liquid electrolyte and separated from one another by respective separator plates, which device does not possess the disadvantages of the known devices of this kind.

Still another object of the present invention is to develop the fuel cell device of the type here under consideration in such a manner as to avoid cell-to-cell electrolyte migration and edge region corrosion due to electric shunt currents.

It is yet another object of the present invention to design an electrolyte migration prevention arrangement for the fuel cell device of the above type in such a manner as to be relatively simple in construction, inexpensive to manufacture, easy to use, and yet reliable in operation.

A concomitant object of the present invention is to devise a process that is excellently suited for manufacturing fuel cell devices equipped with the electrolyte migration preventing arrangement of the above kind.

DISCLOSURE OF THE INVENTION

In keeping with these objects and others which will become apparent hereafter, one feature of the present invention resides in an integral separator plate for use in a fuel cell stack that includes a plurality of juxtaposed fuel cells, which integral separator plate includes a set of basic components including a plate-shaped anode electrode for one, a plate-shaped cathode electrode for another, of adjacent ones of the fuel cells, and a separator plate interposed between the electrodes and delimiting respective interfaces therewith. Each of such basic components has a circumferentially complete outer peripheral region consisting of respective successive marginal portions juxtaposed with one another in respective associated marginal portion sets and delimited by an outer peripheral surface. According to the invention, there is provided means for bounding in at least one of the marginal portions of each of the associated marginal portion sets at least one recess that extends substantially over the entire length of the one marginal portion and is open into one of the interfaces and onto the respective one of the peripheral surfaces Unifying means unifies the separator plate with the successive electrodes into the respective integral separator plate. The integral separator plate further includes means for preventing the flow of electric shunt current in the fuel cell stack between the electrodes on the outer peripheral surface of the separator plate of the integral separator plate. In accordance with the invention, such preventing means includes a substantially circumferentially complete electrolyte-nonwettable barrier constituted by a barrier member in each of the recesses, and means for holding the barrier member in the recess therefor.

BRIEF DESCRIPTION OF THE DRAWING

The present invention will be described in more detail below with reference to the accompanying drawing in which.

BEST MODE FOR CARRYING OUT THE INVENTION

Figure 1:
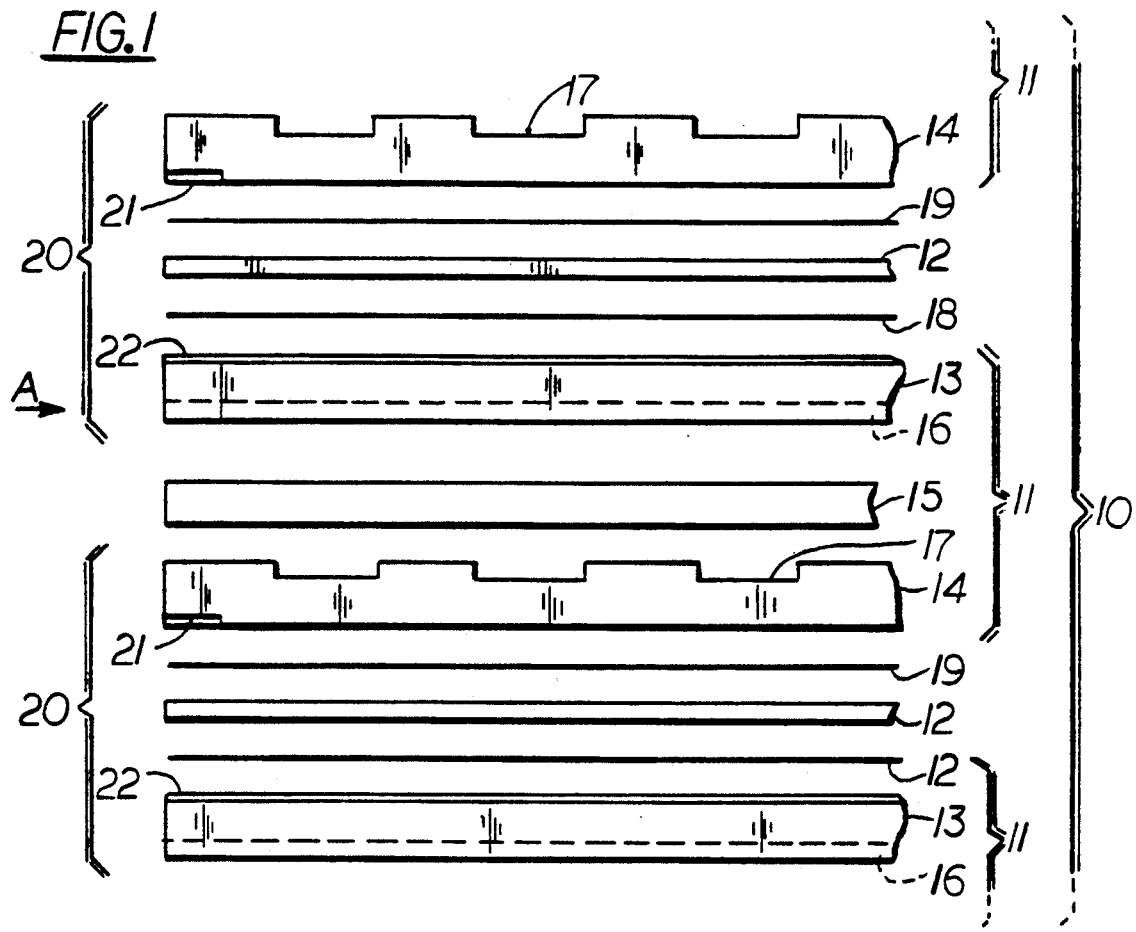
FIG. 1 is a somewhat simplified exploded side elevational view of a fragment of a fuel cell stack including components needed for the fabrication of integral separator plates embodying the present invention.

Referring now to the drawing in detail, and first to FIG. 1 thereof, it may be seen that the reference numeral 10 has been used therein to identify a fuel cell stack of a fuel cell device that is of a known construction so that it that need not be explained here in detail. Suffice it to say that the stack 10 includes a plurality of individual fuel cells, denoted as 11 without differentiation therebetween, which are juxtaposed with one another (usually superimposed as shown) and are separated from each other by respective separator plates, each being identified by the reference numeral 12.

The fully depicted fuel cell 11 (and, similarly, each of the other fuel cells 11 of the stack 10) includes, as its basic components, an anode electrode 13, a cathode electrode 14, and an electrolyte body 15 disposed between the electrodes 13 and 14. In the illustrated fuel cell structure, the electrolyte body 15 is constructed as a solid material plate, such as a porous electrolyte-retaining matrix. However, it is to be mentioned at this juncture that the construction of the individual fuel cells 11 is depicted in the drawing only in such a detail as is necessary for understanding the present invention and to the extent needed to explain the principles of construction and operation of the fuel cells 11 and of the fuel cell stack 10 including the same, and that the actual construction of the fuel cells 11 may vary from that depicted. So, for instance, catalyst layers that are typically present at the interfaces between the electrodes 13 and 14 and the electrolyte matrix 15, and that can be constructed as separate plates or sheets or as layers applied either to the electrodes 13 and 14, or to the electrolyte matrix 15, or to both, have been omitted from the drawing. Furthermore, the electrodes 13 and 14 have been shown to be provided, at their regions facing the electrolyte matrix 15, with respective channels 16 and 17 serving to distribute gaseous fuel (such as hydrogen) and oxygen (alone or as a constituent component of air) over the anode electrode 13 and the cathode electrode 14, respectively. For reasons that will be explained in more detail later, the electrodes 13 and 14 are usually initially porous throughout so that the electrolyte can enter, be retained in, or flow through them.

As also illustrated in FIG. 1, which is an exploded view showing the various components of the fuel cell stack 10 as they exist prior to the stack assembly, sheets 18 and 19 are interposed between the anode electrode 13 and the separator plate 12, and the latter and the cathode electrode 14, respectively. The sheets 18 and 19 are of a material that, in its final form or condition as it exists in the assembled fuel stack 10, is highly resistant if not invulnerable to chemical attack by the electrolyte, and also impermeable to such electrolyte so that it prevents penetration thereof to the respective separator plate 12. Advantageously, this material is also nonwettable by the electrolyte. Fluoroethylenepropylene and similar halogenated hydrocarbon polymers are currently considered to be best suited for this purpose.

In the process of making the fuel cell stack 10 embodying the present invention, a unitary structure 20, often referred to as integral separator plate, is formed prior to the assembly of the stack 10. The integral separator plate 20 includes, in addition to the separator plate 12 proper, the anode electrode 13 which is to belong to one, and the cathode electrode 14 that is to belong to another, adjacent, fuel cell 11 upon assembly of the stack 10. The unitary character of the integral separator plate 20 is obtained by applying pressure and/or heat to an assembly of the integral separator plate components 12 to 14, 18, and 19 that have been previously juxtaposed and properly aligned with one another in the orientation and succession indicated in FIG. 1 of the drawing. In the course of this operation, the material of the respective sheet 18 or 19 is compressed between the separator plate 12 and the respective electrode 13 or 14 and is forced into the pores thereof to a certain penetration depth that depends on the thickness of the respective sheet 18 and 19 and the degree of porosity of the respective electrode 13 or 14 but, in any event, to only a relatively small fraction of the total thickness of the respective electrode 13 or 14, thus plugging such pores in the vicinity of the separator plate 12 but leaving the remainder of the pores unobstructed and thus capable of receiving the electrolyte. The sheet material also adheres to the separator plate 12, thus joining the respective electrode 13 or 14 thereto. When this operation is completed, good electrical contact, which is needed for the fuel cell stack 10 to operate as intended, exists between the separator plate 12, the associated anode electrode 13 on the one hand, and the associated cathode electrode 14 on the other hand, in that the sheet material, which usually exhibits a high degree of electrical resistivity, is pushed out of the way from the areas of electrical contact.

It will be appreciated that, when the stack 10 is in its assembled condition, the electrolyte body 15 contains a quantity of a liquid electrolyte sufficient for an electrochemical reaction, during which oxygen and fuel are combined with one another to form product water, to take place in the respective fuel cell 11, with attendant creation of an electrical potential difference between the anode and cathode electrodes 13 and 14. The separator plate 12 is electrically conductive to provide electrical connection between the adjacent or successive ones of the fuel cells 11 in the stack 10, but it and/or at least the area of the respective electrode 13 or 14 that immediately adjoins it, is as impermeable to liquids and gases as possible, for instance, due to the presence of the material of the respective sheet 18 or 19 thereat, not only to prevent passage of the gaseous fuel or oxygen therethrough with attendant formation of a highly combustible gas mixture, but also to avoid migration of the electrolyte between the individual fuel cells 11 of the stack 10, which is driven or enhanced by the aforementioned electrical potential differences.

Experience has shown that, despite all precautions that are taken to avoid electrolyte loss, some electrolyte still manages to escape from the individual fuel cells 11 during the operation of the fuel cell device and leave the stack 10 after it has reached the periphery thereof or other surfaces at which it comes into contact with any gaseous medium, such as by evaporating into the respective gaseous medium. To make up for this loss and thus to make sure that the fuel cell device is able to operate over an extended operating period, it is currently customary to originally charge each of the fuel cells 11 with more than the above electrolyte quantity that is required to be present in the electrolyte body 15. The additional amount is then typically accommodated in at least one of the electrodes 13 and 14 which, as mentioned above, are porous, so that the respective electrode 13 or 14 doubles as a replenishment electrolyte retaining body from which electrolyte is gradually drawn into the electrolyte body 15 to replenish the electrolyte amounts lost therefrom over the operating lifetime of the fuel cell device.

It was determined that the aforementioned cell-to-cell electrolyte migration, if not curbed in, has a deleterious or even destructive effect on the fuel cell device and its operation, in that it ultimately results in drying out of the fuel cell or cells 11 situated at one end of the stack 10, and in flooding of the cell or cells 11 disposed at the other end of the stack 10, and that it occurs in the fuel cell device as described so far even if the aforementioned measures are taken to assure that the separator plate 12 is completely impervious to the electrolyte. It was realized that such residual electrolyte migration is attributable to the fact that some electrolyte is able to reach the peripheral surface of the fuel cell 11, be it through respective ordinarily sealed interfaces, or through the pores of the respective electrodes 13 and 14 or other components of the fuel cell 11, and wick its way upon the outer peripheral surface of the separator plate 12 to the adjacent fuel cell 11, and so on in succession. It was also realized that, once the electrolyte establishes a continuous path extending between the interfaces 18 and 19 on any region of or all over the outer peripheral surface of the separator plate 12, it electrically bridges the gap between the adjacent fuel cells 11 and conducts electric shunt current which may then cause or contribute to corrosion at the outer periphery of the fuel cell stack 11 and especially on the outer peripheral surface of the separator plate 12.

Based on the above realizations, it is proposed in accordance with the present invention to provide at the periphery of the integral separator plate 20 at least one barrier member 21 situated at least at the region of one interface between the separator plate 12 and one of the electrodes 13 or 14 or, as illustrated, a number of separate barrier members 21 and 22 that are disposed at the regions of the interfaces between the separator plate 12 and different ones of the electrodes 13 or 14, respectively. The barrier member 21, or each of the barrier members 21 and 22, is of a material that is nonwettable by the electrolyte.

Figure 2:
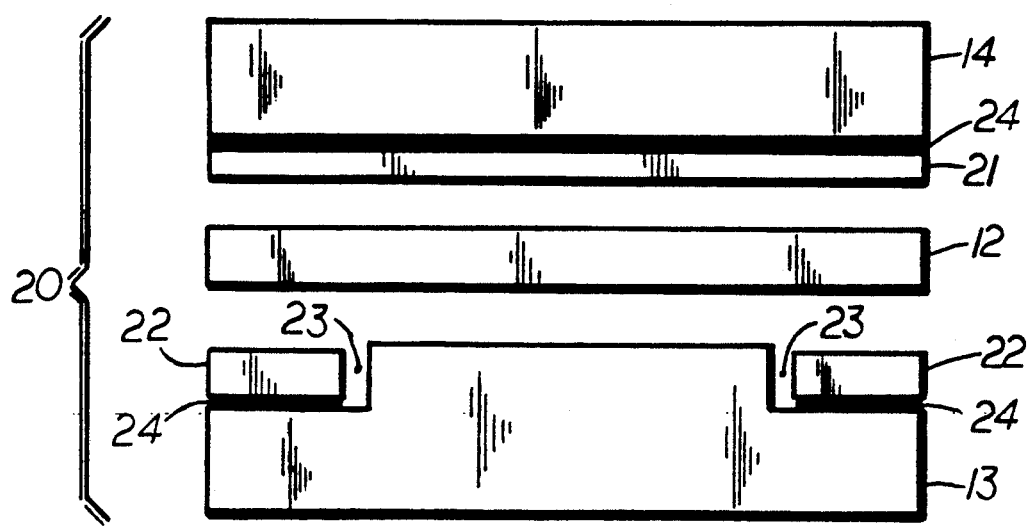
FIG. 2 is a modified exploded side elevational view taken in the direction of an arrow A of FIG. 1 and showing in additional detail certain features of an integral separator plate of the present invention.

As illustrated in more detail in FIG. 2 of the drawing, in which some dimensions have been greatly exaggerated relative to others and certain components and features of the integral separator plate 20 have been omitted to simplify the illustration, the bottom electrode or electrolyte retention plate 13 is provided at its opposite edge regions facing toward the interface with the separator plate 12 with respective recesses 23, each for accommodating a different one of two separate barrier members 22. Respective adhesive layers 24 are shown to be disposed at the bottom surfaces bounding the recesses 23, and they serve to hold the respective barrier members 22 in place at least during the assembly of the components of the integral separator plate 20 and usually for much longer., at least part way into a bonding process that will be explained in some detail below and during which the above components are joined with one another to constitute the integral separator plate 20. The situation is basically the same with respect to the electrode or electrolyte retention plate 14, except that this time the non-illustrated counterparts of the grooves 23, and thus the barrier members 21, are situated at and extend over the entire lengths of the other two edge regions of the electrode 14. Thus, it may be seen that there is a 90° displacement about the vertical axis between the two barrier members 21 and the two barrier members 22, as a consequence of which each of the sides of the integral separator plate 20 is equipped with a different one of the four barrier members 21 and 22 and the four barrier members 21 and 22 together form, in effect, a circumferentially complete barrier on the periphery of the integral separator plate 20. However, it will be appreciated that such a circumferentially complete barrier could also be obtained by accommodating four of the barrier members 21 or 22, or even an integrated frame-shaped barrier structure, in a correspondingly configured circumferentially complete recess akin to the recess 23 provided in the respective electrode 13 or 14 at the respective interface. Consequently, it is to be understood that any reference herein to a barrier member 21 or 22 denotes that part of the barrier structure that is to extend or actually extends over the entire length of one of the sides of the integral separator plate 20, whether it is constituted by an element separate from the other parts of such structure, or by an integral portion of such structure. Also, if so desired, the recess or recesses for the barrier member or members 21 or 22 of the aforementioned types could be formed in the separator plate 12 at least at one of the interfaces, instead of or in addition to being provided in the corresponding electrode 13 or 14.

After the barrier members 21 and 22 have been assembled with and secured by the adhesive layers 23 in the respective recesses, such as 23, of the electrodes 13 and 14 in the manner perceptible from FIG. 2 of the drawing, the integral separator plate can be formed in a pressing or bonding operation. To this end, the components 13, 18, 12, 19 and 14 of the integral separator plate 20 that is to be fabricated are first placed, in the proper order, orientation and juxtaposition as depicted in FIG. 1 of the drawing, on a support, and pressure is then exerted in any known manner, as indicated by an arrow 24, on the top electrode 14. This pressure has such a magnitude, and is exerted while the assembly constituting the precursor of the integral separator plate 20 is at such a temperature, that the material of the sheets 18 and 19 is forced to flow to the desired depth into the pores of the respective electrodes 13 and 14.

Usually, the sheets 18 and 19 are dimensioned so as to be substantially coextensive with the separator plate 12, and thus with the electrodes 13 and 14, prior to the above-mentioned pressing operation. This results in a situation where, during the pressing operation, at least some of the sheet material, especially that which is confined between the separator plate 12 and the respective barrier member 21 or 22, due to its tendency to flow in the directions of least resistance, will be extruded out of the interface. This may require trimming of the extruded material after the completion of the pressing operation. Similarly, it may be necessary to trim excess sheet material if the sheets 18 and 19 were oversized to begin with. However, it may be possible to avoid the need for the trimming operation for the purpose of removing excess amounts of the sheet material by making the respective sheet 18 and 19 small enough to terminate short of the outer edges of the respective separator plate 12, but large enough to assure that a thin layer of the sheet material is formed in the interface between the respective barrier member 21 or 22 and the separator plate 12, without extrusion of any significant amounts of the sheet material out of this interface.

The above pressing operation has to be conducted under conditions that will assure that the material of the sheets 18 and 19 will indeed behave in the aforementioned manner. When fluoroethylenepropylene (such that marketed by E. I. Dupont & Co. as TEFLON TM FEP) is chosen to constitute such material, it has been found to be advantageous to use sheets of such material with a sheet thickness of about 0.005 inch, and to conduct the pressing operation at an elevated temperature of up to about 620° F. (at which the sheet material is in its relatively low viscosity or molten state) and to exert substantially uniformly distributed pressure in the range between 50 and 400 psi against the top electrode 14.

The barrier members 21 and 22 are preferably made of a properly cross-linked fluorohydrocarbon such as the aforementioned fluoroethylenepropylene, and are relatively thin as considered in the vertical direction of FIG. 2. Preferably, the thickness of each of the barrier members 21 and 22 is merely in the range of between 0.005 and 0.02 inch. For reasons that will be addressed more fully later, the respective recess or groove 23 has a depth that is somewhat, such as by 0.002 inch, greater than the thickness of the respective barrier member 21 or 22 to be accommodated therein, while the adhesive layer 24 has a thickness not exceeding about 0.001 inch. As a result, a small gap exists, after the mounting of the respective barrier member 21 or 22 and the integral separator plate component assembly, between the barrier member 21 or 22 and the facing surface of the separator plate 12. The size of this gap exceeds that needed prior to the commencement of the pressing operation for accommodating the thickness of the portion of the respective sheet 18 or 19 that is present at this region.

The layer 23 may be that of a fluoroelastomer that is in its liquid state at the time of its application. For example, FLUOREL ® brand flouroelastomer from the 3M Corporation may be dissolved by solvent into liquid suspension and then used accordingly by applying it to the barrier member 21 or 22, or to the bottom of the process 23, or both. However, it is also contemplated to make and secure the barrier members 21 and 22 by using a tape of the desired electrolyte-nonwettable material that is provided with integral pressure-sensitive adhesive.

As mentioned before, the pressing operation is conducted at elevated temperatures As a result, the various integral separator plate component materials undergo thermal expansion, at different rates, as they are brought to such elevated temperatures. So, for instance, the thermal expansion coefficient of the aforementioned TEFLON FEP material of the barrier members 21 and 22 is about $100 \times 10^{-6}$ inch/inch/° F., versus about $2 \times 10^{-6}$ inch/inch/° F. for the graphite-based material of the electrolyte retention plates or electrodes 13 and 14. This means that the material of the barrier members 21 and 22 expands to a much greater extent than that of the respective electrode 13 or 14 as their temperature is being raised during the above pressing or bonding operation. As a consequence of this, and of the pressing of the electrodes 13 and 14 and the separator plate 12 together, with attendant reduction in the spacing therebetween, the excess gap originally present between the respective barrier member 21 or 22 and the separator plate 12 is eliminated and the respective two of them are bonded together. At the same time, while volatile components of the material of the adhesive layer 24 evaporate, the remaining components of such material become cross-linked with one another or with the surrounding materials, and a permanent bond is established at this region of the respective barrier member 21 or 22 as well. Then, as the integral separator plate 20 is cooled, at reduced pressure, following the pressing operation proper, the reverse is true: the material of the barrier members 21 and 22 has a tendency to shrink more that the adjacent materials. Yet, because of the existence of the aforementioned permanent bonds, the barrier member material is prevented from dissociating itself from either the respective electrode 13 or 14, or the separator plate 12, in spite of this tendency. This induces some stresses in the barrier member material; however, such stresses have low enough values not to damage the barrier member material or compromise the integrity of the aforementioned permanent bonds. In any event, the values of such stresses can be minimized by performing the pressing or bonding operation at temperatures that tend toward the melting point (about 530° to 540° F.) of the material of the sheets 18 and 19. In any event, the presence of the oversized gap between the respective barrier member 21 or 22 and the separator plate 12 at the beginning of the pressing operation avoids the otherwise existing danger of cracking or otherwise damaging the barrier member 21 or 22 during the pressing operation.

When the integral separator plate 20 is eventually incorporated in the assembled and operating fuel cell stack 10, the aforementioned circumferentially complete barrier, owing to the nonwettability of the material of the barrier members, such as 21 and 22, constituting the same, interrupts the path along which the electrolyte could otherwise creep from one of the fuel cells 11 to the adjacent one, and so on in sequence, thus interfering with and in many instances completely preventing peripheral cell-to-cell electrolyte migration, while simultaneously preventing the leaking electrolyte from forming the aforementioned electrical path through which the electrical shunt current would otherwise flow, with the attendant deleterious corrosive effect.

It stands to reason that the barrier is to be present at all four of the edge regions of the separator plate 12 and over their entire lengths, so as to completely interrupt any path along which the electrolyte could possibly creep between the adjacent or successive fuel cells 11 over the outer peripheral surface of the separator plate 12. However, the 90° displaced arrangement of the two barrier members 21 at one, and of the two barrier members 22 at the other, of the interfaces between the separator plate 12 and the electrodes 13 and 14 complies with this requirement for circumferential completeness in a satisfactory manner. It is also self-evident that each barrier member 21 or 22 has to have a surface area of a width as considered in the directions of possible electrolyte and/or shunt current flow paths that is sufficient to prevent the electrolyte from forming such paths on a permanent, and preferably even on an intermittent, basis.

Dye penetrant tests conducted using integral separator plates 20 provided with the peripherally complete nonwettable barrier structure obtained in the above-described manner and consisting of the integrated barrier members 21 and 22 have confirmed that this structure present on the periphery of the integral separator plate 20 constitutes a barrier against cell-to-cell electrolyte migration over the outer periphery of the separator plate 12 that is as close to being perfect as possible. This is so even when, as is often necessary, a material-removing operation is performed on the outer periphery of the integral separator plate 20 after the latter has been manufactured in the above-discussed manner. As a matter of fact, a 1,000 to 10,000-fold reduction has been observed in the magnitude of the electric shunt currents in comparison to the above-described prior integral separator plate construction in which the electrodes are directly bonded to one another.

While the present invention has been illustrated and described as embodied in a particular construction of a fuel cell device and an integral separator plate to be used therein, it will be appreciated that the present invention is not limited to this particular example; rather, the scope of protection of the present invention is to be determined solely from the attached claims.

We claim:

1. A fuel cell stack with shunt current barriers at a periphery thereof, comprising a plurality of fuel cells juxtaposed with one another in the stack and each including a pair of plate-shaped anode and cathode electrodes facing one another and each having a circumferentially complete outer peripheral region consisting of respective marginal portions, and a quantity of liquid electrolyte present at least between said electrodes;

a multitude of separator plates each interposed between respective successive electrodes of adjacent ones of said fuel cells, delimiting respective interfaces therewith, and having marginal portions juxtaposed in respective associated sets with all of said marginal portions of said successive electrodes and collectively delimited by an outer peripheral surface;

means for bounding in at least one of said marginal portions of each of said associated sets at least one recess that extends substantially over the entire length of said one marginal portion and is open into one of said interfaces and onto the periphery of the fuel cell stack;

means for unifying said separator plates with said successive electrodes into respective integral separator plates;

means for preventing the flow of electric shunt current in said fuel cell stack between said successive electrodes on said outer peripheral surface of said separator plate of each of said integral separator plates, including at least one substantially circumferentially complete electrolyte-nonwettable barrier constituted by a barrier member in each of said recesses, and means for holding said barrier member in said recess therefor;

means for supplying a gaseous fuel and oxygen to said anode electrode and said cathode electrode of each of said pairs, respectively; and means for withdrawing electric current from the fuel cell stack.

2. The fuel cell stack as defined in claim 1, wherein circumferentially adjacent ones of said barrier members and of said recesses accommodating the same are situated at different ones of said interfaces of said integral separator plate.

3. The fuel cell stack as defined in claim 1, wherein said bounding means bounds said recess for the respective one of said barrier members exclusively in one of said electrodes.

4. The fuel cell stack as defined in claim 1, wherein said holding means includes an adhesive layer bonding the respective one of said barrier members in the associated one of said recesses at least until said unifying means becomes effective.

5. The fuel cell stack as defined in claim 1, wherein each of said barrier members is substantially flush with the periphery of the fuel cell stack.

6. An integral separator plate for use in a fuel cell stack that includes a plurality of juxtaposed fuel cells, comprising a set of basic components including a plate-shaped anode electrode for one, a plate-shaped cathode electrode for another, of adjacent ones of the fuel cells, and a separator plate interposed between said electrodes and delimiting respective interfaces therewith, each of said basic components having a circumferentially complete outer peripheral region consisting of respective successive marginal portions juxtaposed with one another in respective associated marginal portion sets and delimited by an outer peripheral surface;

means for bounding in at least one of said marginal portions of each of said associated marginal portion sets at least one recess that extends substantially over the entire length of said one marginal portion and is open into one of said interfaces and onto the respective one of said peripheral surfaces;

means for unifying said separator plates with said successive electrodes into said integral separator plate; and means for preventing the flow of electric shunt current in the fuel cell stack between said electrodes on said outer peripheral surface of said separator plate of said integral separator plate, including a substantially circumferentially complete electrolyte-nonwettable barrier constituted by a barrier member in each of said recesses, and means for holding said barrier member in said recess therefor.

7. The integral separator plate as defined in claim 6, wherein circumferentially adjacent ones of said barrier members and of said recesses accommodating the same are situated at different ones of said interfaces of said integral separator plate.

8. The integral separator plate as defined in claim 6, wherein said bounding means bounds said recess for the respective one of said barrier members exclusively in one of said electrodes.

9. The integral separator plate as defined in claim 6, wherein said holding means includes an adhesive layer bonding the respective one of said barrier members in the associated one of said recesses at least until said unifying means becomes effective 10. The integral separator plate as defined in claim 6, wherein each of said barrier members is substantially flush with said peripheral surface of said one marginal portion.

* * * * *